(12) United States Patent
Chen et al.

(10) Patent No.: US 8,505,036 B2
(45) Date of Patent: Aug. 6, 2013

(54) UNIFIED APPLICATION PROGRAMMING INTERFACE FOR A PROCESS CONTROL SYSTEM NETWORK

(75) Inventors: Deji Chen, Austin, TX (US); Mark J. Nixon, Round Rock, TX (US); Tom Aneweer, Georgetown, TX (US); John R. Shepard, Austin, TX (US); Aloysius K. Mok, Ausitn, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 1273 days.

(21) Appl. No.: 11/537,531

(22) Filed: Sep. 29, 2006

(65) Prior Publication Data

US 2008/0148296 A1 Jun. 19, 2008

(51) Int. Cl.
*G06F 3/00* (2006.01)

(52) U.S. Cl.
USPC .......................................................... 719/328

(58) Field of Classification Search
None
See application file for complete search history.

(56) References Cited

U.S. PATENT DOCUMENTS

| | | | | |
|---|---|---|---|---|
| 5,778,189 | A * | 7/1998 | Kimura et al. | 709/236 |
| 7,370,335 | B1 * | 5/2008 | White et al. | 719/328 |
| 7,436,797 | B2 | 10/2008 | Shepard et al. | |
| 7,447,612 | B2 | 11/2008 | Keyes, IV et al. | |
| 2001/0032232 | A1 * | 10/2001 | Zombek et al. | 709/201 |
| 2003/0110314 | A1 * | 6/2003 | Barnes | 709/328 |
| 2004/0054640 | A1 * | 3/2004 | Reichel et al. | 707/1 |
| 2004/0057464 | A1 | 3/2004 | Sanders | |
| 2006/0077917 | A1 | 4/2006 | Brahmajosyula et al. | |
| 2006/0117295 | A1 | 6/2006 | Wu et al. | |

FOREIGN PATENT DOCUMENTS

| | | | |
|---|---|---|---|
| EP | 518195 A2 | * | 12/1992 |
| GB | 2 427 329 A | | 12/2006 |
| JP | 2003-330533 A | | 11/2003 |
| JP | 2005-539299 A | | 12/2005 |
| WO | WO-2006/026749 A2 | | 3/2006 |
| WO | WO-2006/133019 A2 | | 12/2006 |

OTHER PUBLICATIONS

Examination Report for Application No. GB0719097.8, dated Dec. 6, 2010.
First Office Action in Chinese Patent Application No. 200710151695.3 dated Mar. 18, 2011.
Office Action for Japanese Application No. 2007-254089, dated Jan. 24, 2012.

* cited by examiner

*Primary Examiner* — H S Sough
*Assistant Examiner* — Carina Yun
(74) *Attorney, Agent, or Firm* — Marshall, Gerstein & Borun LLP

(57) ABSTRACT

An application programming interface schema, method and system for communicating between first and second application programming interfaces within a process control system includes processing a call from a first application programming interface for a data request, translating the data request from the first application programming interface into one or more methods of a unified application programming interface, and implementing the one or more methods of the unified application programming interface with a second application programming interface. A first unified layer receives a transmission request from a proprietary application programming interface, and translates the transmission request into one or more methods of a unified application programming interface. A second unified layer implements methods of the unified application programming interface with the wireless network application programming interface.

35 Claims, 5 Drawing Sheets

UNIFIED APPLICATION PROGRAMMING INTERFACE FOR A PROCESS CONTROL SYSTEM NETWORK

FIELD OF THE TECHNOLOGY

The present disclosure relates generally to process control systems within process plants and, more particularly, to wireless interfaces within a process control system network.

BACKGROUND

Process control systems are widely used in factories and/or plants in which products are manufactured or processes are controlled (e.g., chemical manufacturing, power plant control, etc.). Process control systems are also used in the harvesting of natural resources such as, for example, oil and gas drilling and handling processes, etc. In fact, virtually any manufacturing process, resource harvesting process, etc. can be automated through the application of one or more process control systems. It is believed the process control systems will eventually be used more extensively in agriculture as well.

Process control systems, like those used in chemical, petroleum or other processes, typically include one or more centralized or decentralized process controllers communicatively coupled to at least one host or operator workstation and to one or more process control and instrumentation devices, such as field devices, via analog, digital or combined analog/digital buses. Field devices, which may be, for example valves, valve positioners, switches, transmitters, and sensors (e.g., temperature, pressure and flow rate sensors), perform functions within the process such as opening or closing valves and measuring process parameters. The process controller receives signals indicative of process measurements or process variables made by or associated with the field devices and/or other information pertaining to the field devices, uses this information to implement a control routine and then generates control signals which are sent over one or more of the buses to the field devices to control the operation of the process. Information from the field devices and the controller is typically made available to one or more applications executed by an operator workstation to enable an operator to perform desired functions with respect to the process, such as viewing the current state of the process, modifying the operation of the process, etc.

The various devices within the process plant may be interconnected in physical and/or logical groups to create a logical process, such as a control loop. Likewise, a control loop may be interconnected with other control loops and/or devices to create sub-units. A sub-unit may be interconnected with other sub-units to create a unit, which in turn, may be interconnected with other units to create an area. Process plants generally include interconnected areas, and business entities generally include process plants which may be interconnected. As a result, a process plant includes numerous levels of hierarchy having interconnected assets, and a business enterprise may include interconnected process plants. In other words, assets related to a process plant, or process plants themselves, may be grouped together to form assets at higher levels.

The manner in which process control systems are implemented has evolved over the years. Older generations of process control systems were typically implemented using dedicated, centralized hardware and hard-wired connections. However, modern process control systems are typically implemented using a highly distributed network of workstations, intelligent controllers, smart field devices, and the like, some or all of which may perform a portion of an overall process control strategy or scheme. In particular, most modern process control systems include smart field devices and other process control components that are communicatively coupled to each other and/or to one or more process controllers via one or more digital data buses. In addition to smart field devices, modern process control systems may also include analog field devices such as, for example, 4-20 milliamp (mA) devices, 0-10 volts direct current (VDC) devices, etc., which are typically directly coupled to controllers as opposed to a shared digital data bus or the like.

In a typical industrial or process plant, a distributed control system (DCS) is used to control many of the industrial processes performed at the plant. The plant may have a centralized control room having a computer system with user input/output (I/O), a disc I/O, and other peripherals known in the computing art with one or more process controllers and process I/O subsystems communicatively connected to the centralized control room. Additionally, one or more field devices are typically connected to the I/O subsystems and to the process controllers to implement control and measurement activities within the plant. While the process I/O subsystem may include a plurality of I/O ports connected to the various field devices throughout the plant, the field devices may include various types of analytical equipment, silicon pressure sensors, capacitive pressure sensors, resistive temperature detectors, thermocouples, strain gauges, limit switches, on off switches, flow transmitters, pressure transmitters, capacitance level switches, weigh scales, transducers, valve positioners, valve controllers, actuators, solenoids, indicator lights or any other device typically used in process plants.

As used herein, the term "field device" encompasses these devices, as well as any other device that performs a function in a control system. In any event, field devices may include, for example, input devices (e.g., devices such as sensors that provide status signals that are indicative of process control parameters such as, for example, temperature, pressure, flow rate, etc.), as well as control operators or actuators that perform actions in response to commands received from controllers and/or other field devices.

Traditionally, analog field devices have been connected to the controller by two-wire twisted pair current loops, with each device connected to the controller by a single two-wire twisted pair. Analog field devices are capable of responding to or transmitting an electrical signal within a specified range. In a typical configuration, it is common to have a voltage differential of approximately 20-25 volts between the two wires of the pair and a current of 4-20 mA running through the loop. An analog field device that transmits a signal to the control room modulates the current running through the current loop, with the current being proportional to the sensed process variable.

Historically, most traditional field devices have had either a single input or a single output that was directly related to the primary function performed by the field device. For example, the only function implemented by a traditional analog resistive temperature sensor is to transmit a temperature by modulating the current flowing through the two-wire twisted pair, while the only function implemented by a traditional analog valve positioner is to position a valve somewhere between a fully open and a fully closed position based on the magnitude of the current flowing through the two-wire twisted pair.

More recently, field devices that are part of hybrid systems become available that superimpose digital data on the current loop used to transmit analog signals. One such hybrid system is known in the control art as the Highway Addressable Remote Transducer (HART) protocol. The HART system uses the magnitude of the current in the current loop to send an analog control signal or to receive a sensed process variable (as in the traditional system), but also superimposes a digital carrier signal upon the current loop signal. This enables two-way field communication to take place and makes it possible for additional information beyond just the normal process variable to be communicated to/from a smart field instrument. Generally, the digital carrier signal is used to send secondary and diagnostic information and is not used to realize the primary control function of the field device. Examples of information provided over the digital carrier signal include secondary process variables, diagnostic information (including sensor diagnostics, device diagnostics, wiring diagnostics, and process diagnostics), operating temperatures, a sensor temperature, calibration information, device ID numbers, materials of construction, configuration or programming information, etc. Accordingly, a single hybrid field device may have a variety of input/output data points generating a variety of input/output variables and may implement a variety of functions.

More recently, a newer control protocol has been defined by the Instrument Society of America (ISA). The new protocol is generally referred to as Fieldbus, and is specifically referred to as SP50, which is as acronym for Standards and Practice Subcommittee 50. Fieldbus is a nonproprietary open standard and is now prevalent in the industry and, as such, many types of Fieldbus devices have been developed and are in use in process plants. Because Fieldbus devices are used in addition to other types of field devices, such as HART and 4-20 mA devices, with a separate support and I/O communication structure associated with each of these different types of devices.

Newer smart field devices, which are typically all digital in nature, have maintenance modes and enhanced functions that are not accessible from or compatible with older control systems. Even when all components of a distributed control system adhere to the same standard (such as the Fieldbus standard), one manufacturer's control equipment may not be able to access the secondary functions or secondary information provided by another manufacturer's field devices.

Thus, one particularly important aspect of process control system design involves the manner in which field devices are communicatively coupled to each other, to controllers and to other systems or devices within a process control system or a process plant. In general, the various communication channels, links and paths that enable the field devices to function within the process control system are commonly collectively referred to as an input/output (I/O) communication network. One development in communicating process control information between various systems, devices and components within a process control system is object linking and embedding (OLE) for process control (OPC) which provides a mechanism that eliminates the need for individual custom communications software drivers that convey real time process control data between the systems, devices and components of a process control system. As is well known, OPC is based on Microsoft object linking and embedding (OLE) technology, which provides a common interface for the various systems, devices and components making tip a process control system. OPC further defines an application programming interface (API) for different process control systems to exchange information. As such, OPC has been used as an industry standard to I/O communications within and among process control systems. Typically, each of the systems, devices and components of the process control system includes an OPC communication layer and, thus, speaks a common standardized language for purposes of conveying process control information.

Further, the communication network topology and physical connections or paths used to implement an I/O communication network can have a substantial impact on the robustness or integrity of field device communications, particularly when the I/O communications network is subjected to environmental factors or conditions associated with the process control system. For example, many industrial control applications subject field devices and their associated I/O communication networks to harsh physical environments (e.g., high, low or highly variable ambient temperatures, vibrations, corrosive gases or liquids, etc.), difficult electrical environments (e.g., high noise environments, poor power quality, transient voltages, etc.), etc. In any case, environmental factors can compromise the integrity of communications between one or more field devices, controllers, etc. In some cases, such compromised communications could prevent the process control system from carrying out its control routines in an effective or proper manner, which could result in reduced process control system efficiency and/or profitability, excessive wear or damage to equipment, dangerous conditions that could damage or destroy equipment, building structures, the environment and/or people, etc.

In order to minimize the effect of environmental factors and to assure a consistent communication path, I/O communication networks used in process control systems have historically been hardwired networks, with the wires being encased in environmentally protected materials such as insulation, shielding and conduit. Also, the field devices within these process control systems have typically been communicatively coupled to controllers, workstations, and other process control system components using a hardwired hierarchical topology in which non-smart field devices are directly coupled to controllers using analog interfaces such as, for example, 4-20 mA, 0-10 VDC, etc. hardwired interfaces or I/O boards. Smart field devices, such as Fieldbus devices, are also coupled via hardwired digital data busses, which are coupled to controllers via smart field device interfaces.

While hardwired I/O communication networks can initially provide a robust I/O communication network, their robustness can be seriously degraded over time as a result of environmental stresses (e.g., corrosive gases or liquids, vibration, humidity, etc.). For example, contact resistances associated with the I/O communication network wiring may increase substantially due to corrosion, oxidation and the like. In addition, wiring insulation and/or shielding may degrade or fail, thereby creating a condition under which environmental electrical interference or noise can more easily corrupt the signals transmitted via the I/O communication network wires. In some cases, failed insulation may result in a short circuit condition that results in a complete failure of the associated I/O communication wires.

Additionally, hardwired I/O communication networks are typically expensive to install, particularly in cases where the I/O communication network is associated with a large industrial plant or facility that is distributed over a relatively large geographic area, for example, an oil refinery or chemical plant that consumes several acres of land. In many instances, the wiring associated with the I/O communication network must span long distances and/or go through, under or around many structures (e.g., walls, buildings, equipment, etc.) Such long wiring runs typically involve substantial amounts of labor, material and expense. Further, such long wiring runs are especially susceptible to signal degradation due to wiring impedances and coupled electrical interference, both of which can result in unreliable communications.

Moreover, such hardwired I/O communication networks are generally difficult to reconfigure when modifications or updates are needed. Adding a new field device typically requires the installation of wires between the new field device and a controller. Retrofitting a process plant in this manner may be very difficult and expensive due to the long wiring runs and space constraints that are often found in older process control plants and/or systems. High wire counts within conduits, equipment and/or structures interposing along available wiring paths, etc., may significantly increase the difficulty associated with retrofitting or adding field devices to an existing system. Exchanging an existing field device with a new device having different field wiring requirements may present the same difficulties in the case where more and/or different wires have to be installed to accommodate the new device. Such modifications may often result in significant plant downtime.

Wireless I/O communication networks have been used to alleviate some of the difficulties associated with hardwired I/O networks. For example, Shepard et al., U.S. patent application Ser. No. 11/156,215 entitled "Wireless Architecture And Support For Process Control Systems" and filed Jun. 17, 2005, the contents of which are expressly incorporated by reference herein, discloses that relatively inexpensive wireless mesh networks may be deployed within a process control system, either alone or in combination with point-to-point communications, to produce a robust wireless communication network that can be easily set up, configured, changed and monitored, to thereby make the wireless communication network more robust, less expensive and more reliable.

In one example, wireless networks may be used for the area control network between workstations and controllers, and may be developed similar to wireline area control networks. The area control network is developed as part of the process control system, and supports communication among the controllers that control the process and the workstations that configure and monitor the process. Middleware is defined and implemented to hook the software systems of the process control system and the underlying network of the area control network, and the process control system and the underlying network are developed according to the middleware. The process control system generally uses proprietary communications, including proprietary application programming layers, among the networks. The area control network is typically part of the process control system architecture, and make sure of standard network protocols at the lower communication layers and contain proprietary upper layers to merge with the remainder of the process control system.

However, the network used for an area control network may not easily be replaced with a different type of network, either in hardware or in software. In particular, because the process control system is developed according to the standards of the area control network, changes in the area control network may require a rewrite or redesign of the software for the process control system from the proprietary layer to the wireless layer. This becomes problematic when developing a wireless area control network, because there are many different wireless standards created for different purposes, each of which may be used for the area control network. For example, the introduction of different wireless standards, whether through additional networks, upgrading or replacement, may require a software rewrite redesign for all or part of the process control system if different wireless standards are introduced. It would be beneficial to be able to utilize different wireless standards within a process control system and/or to upgrade or replace existing wireless networks with other wireless networks using a different wireless standard.

SUMMARY

Communicating between a first application programming interface and a second application programming interface is facilitated by providing a unified application programming interface between the first and second application programming interfaces. A call from the first application programming interface for a data request, such as a transmission request or an access request is processed and translated from the first application programming interface into one or more methods of the unified application programming interface. The one or more methods of the unified application programming interface are implemented with the second application programming interface.

The first application programming interface and the second application programming interface may correspond to a proprietary application programming interface of the process control system and a wireless network application programming interface of a wireless network, respectively or vice versa. The wireless network may be the underlying network for an area control network. A first unified layer communicatively coupled to the proprietary application programming interface and to the unified application programming interface, receives the request, and translates the request into the one or more methods of the unified application programming interface. A second unified layer communicatively coupled to the wireless network application programming interface and to the unified application programming interface implements the methods of the unified application programming interface with the wireless network application programming interface.

The methods of the unified application programming interface may include a small set of methods, such as a read method, a write method and a respond method. The methods may be implemented with the other application programming interfaces by translating the unified application programming interface methods to methods of the other application programming interface and calling into the application programming interface with the translated methods. The read, write and respond methods may be used for most communications in an area control network between a process controller and a workstation or workstation application, including configuration downloads/uploads, control commands, monitoring, alarms/events and information retrieval.

The unified application programming interface may be implemented with any wireless standard. Different wireless standards may be used in the underlying wireless network, and may be replaced with wireless networks having other wireless standards without changing the software of the process control system or the wireless network, such as the proprietary application programming interface or the wireless network application programming interface. For example, by injecting the two unified layers, a new wireless network may be implemented by replacing just the lower unified layer, and the unified application programming interface works with the new wireless application programming interface. The unified application programming interface, the upper unified layer and the proprietary application programming interface remain the same. Likewise, the process control systems may be replaced or upgraded by changing the upper unified layer without changing the unified application programming interface, the lower unified layer and the wireless network application programming interface.

DETAILED DESCRIPTION

Figure 1:
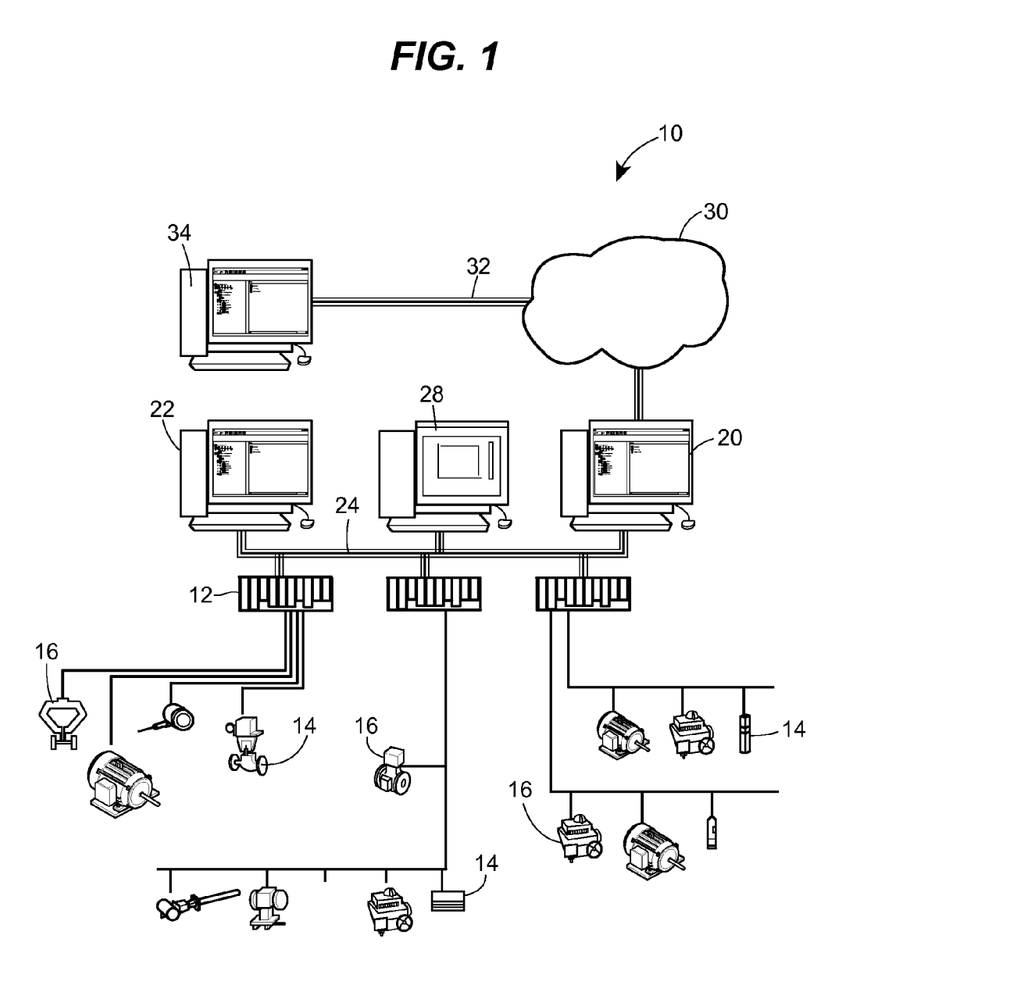
FIG. 1 is a schematic diagram of a process plant displaying an example of a hierarchical structure of equipment and instructions implemented in a process plant.

Referring now to FIG. 1, a process plant 10 includes a distributed process control system having one or more controllers 12, each of which is connected to one or more field devices 14 and 16 via input/output (I/O) devices or cards which may be, for example, Fieldbus interfaces, Profibus interfaces, HART interfaces, standard 4-20 ma interfaces, etc. The controllers 12 are also coupled to one or more host or operator workstations 20 and 22 via a data highway 24 which may be, for example, wireless area control network. A database 28 may be connected to the wireless network 24 and operates as a data historian to collect and store parameter, status and other data associated with the controllers 12 and field devices 14, 16 within the plant 10. Additionally or alternatively, the database 28 may operate as a configuration database that stores the current configuration of the process control system within the plant 10 as downloaded to and stored within the controllers 12 and field devices 14 and 16. While the controllers 12, the I/O cards and the field devices 14 and 16 are typically located down within and are distributed throughout the sometimes harsh plant environment, the operator workstations 20 and 22 and the database 28 are usually located in control rooms or other less harsh environments easily assessable by controller or maintenance personnel.

As is known, each of the controllers 12, which may be by way of example, the DeltaV controller sold by Fisher-Rosemount Systems, Inc., stores and executes a controller application that implements a control strategy using any number of different, independently executed, control modules or blocks. Each of the control modules can be made up of what are commonly referred to as function blocks wherein each function block is a part or a subroutine of an overall control routine and operates in conjunction with other function blocks (via communications called links) to implement process control loops within the process plant 10. As is well known, function blocks, which may but need not be objects in an object oriented programming protocol, typically perform one of an input function, such as that associated with a transmitter, a sensor or other process parameter measurement device, a control function, such as that associated with a control routine that performs proportional-integral-derivative (PID), fuzzy logic, etc. control, or an output function that controls the operation of some device, such as a valve, to perform some physical function within the process plant 10. Of course hybrid and other types of complex function blocks exist such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function chart, ladder logic, etc. and are not limited to being designed and implemented using the function block or any other particular programming technique.

In the plant 10 illustrated in FIG. 1, the field devices 14 and 16 connected to the controllers 12 may be standard 4-20 ma devices, may be smart field devices, such as HART, Profibus, or FOUNDATION® Fieldbus field devices, which include a processor and a memory, or may be any other desired type of field device. Some of these devices, such as Fieldbus field devices (labeled with reference number 16 in FIG. 1), may store and execute modules, or sub modules, such as function blocks, associated with the control strategy implemented in the controllers 12. Function blocks, which may be disposed in two different ones of the Fieldbus field devices 16, may be executed in conjunction with the execution of the control modules within the controllers 12 to implement one or more process control loops, as is well known. Of course, the field devices 14 and 16 may be any types of devices, such as sensors, valves, transmitters, positioners, etc. and the I/O devices may be any types of I/O devices conforming to any desired communication or controller protocol such as HART, Fieldbus, Profibus, etc.

Still further, in a known manner, one or more of the workstations 20 and 22 may include user interface applications to enable a user, such as an operator, a configuration engineer, a maintenance person, etc. to interface with the process control network within the plant 10. In particular, the workstation 22 may include one or more user interface applications may which may be executed on a processor within the workstation 22 to communicate with the database 28, the control modules or other routines within the controllers 12 or I/O devices, with the field devices 14 and 16 and the modules within these field devices, etc. to obtain information from the plant, such as information related to the ongoing state of the process control system. The user interface applications may process and/or display this collected information on a display device associated with one or more of the workstations 20 and 22. The collected, processed and/or displayed information may be, for example, process state information, alarms and alerts generated within plant, maintenance data, etc. Likewise, one or more applications may be stored in an executed in the workstations 22 and 20 to perform configuration activities such as creating or configuring the modules to be executed within the plant, to perform control operator activities, such as changing set-points or other control variables, within the plant, etc. Of course the number and type of routines is not limited by the description provided herein and other numbers and types of process control related routines may be stored in an implemented within the workstations 20 and 22 if desired. The workstations 20, 22 may also be connected via, for example, the internet 30, extranet, bus, Ethernet, etc., to a corporate WAN 32 as well as to a computer system 34 that enables remote monitoring of or communication with the plant 10 from remote locations. Although reference to the workstations 20, 22 is may throughout this disclosure, it should be understood that the each workstation 20, 22 may execute various process control applications. As such, reference to functions of the workstations 20, 22 (e.g., requests, transmissions, data receipt, etc.) may refer to one or more applications executed by the workstations 20, 22. It should further be understood that the workstations 20, 22 may not be limited to any particular machine or computer, and the functions of the workstations 20, 22 may be distributed among a plurality of computer, servers or other computing devices.

Using the above process control system, the controllers 12 may be used to control the devices 14, 16, and the workstations 20, 22 may be used to issue control strategies and commands to the controllers 12. Further, the status of devices 14, 16 or other entities in the control system may be monitored at the workstations 20, 22 by receiving process control data, alarm/event data, or any other status information from the controllers 12. Data traffic on the area control network 28 may be categorized into the following groups: configuration download/upload, control, monitor, alarm/event and information retrieval. For example, In communications involving process control configuration, control strategies in the controllers 12 may be configured in the workstations 20, 22 and downloaded to the controllers 12 using one or a series of writes. Control strategies may also be received from the controller 12 as an upload to the workstations 20, 22. For control communications, the workstations 20, 22 may issue commands to the controller 12 to change a process control value in the process control system, such as a set point of a process control loop. For monitor communications, the controller 12 may periodically transmit real-time process control data to the workstations 20, 22 to allow operators or other personnel, or even applications on the workstations 20, 22, to monitor a device 14, 16 or other process control entity. For alarm/event communications, the controller 12 delivers alarms and events generated from the control system to the workstation 20, 22. For information retrieval, the workstations 20, 22 may request data from the controller 12 for diagnostics or other purposes.

Depending on the data category, the importance of the data may result in the occurrence of delivery guarantees or no delivery guarantee. For example, configuration and control communications should be made without failure and may require a deliver guarantee. Monitoring communications are generally sent unsolicited from the controller 12 and may not require delivery guarantees. Alarm communications should be made with guaranteed delivery, whereas event communications may not require delivery guarantees. Delivery guarantees for information retrieval communications may also depend on the importance of the requested information, and a workstation 20, 22 may retrieve the requested data one item at a time, with a delivery guarantee for each item. As such, the communications across the area control network 28 may involve return values to signifying the success or failure of a communication. Although various categories of data traffic on the area control network 28 have been described, it should be understood that communications among the area control network 28 are not necessarily limited to the above groups, and may include various data requests between the controllers 12 and the workstations 20, 22, such as, but not limited to, transmission requests and access requests.

Figure 2A:
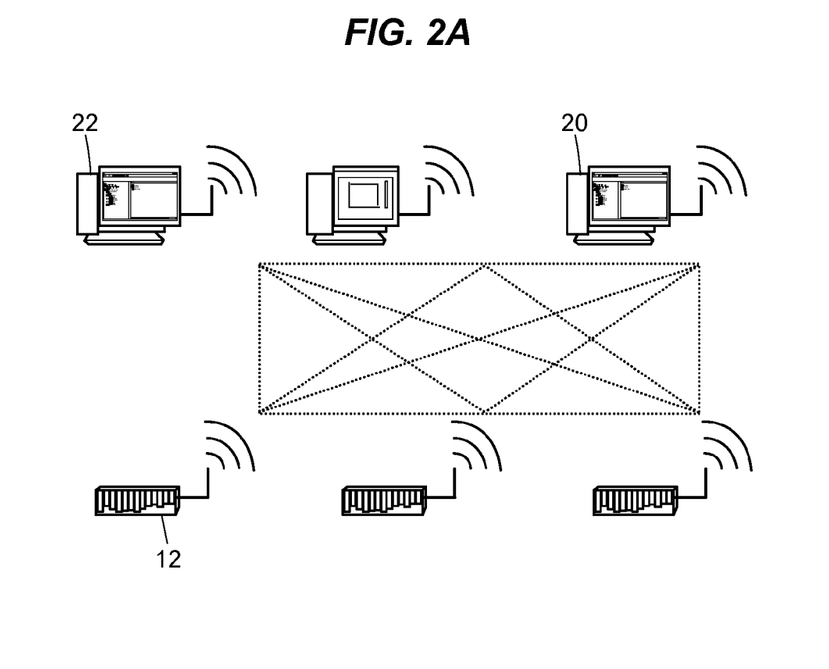
FIGS. 2A and 2B are schematic diagrams of wireless networks deployed in a process control system.
Figure 2B:
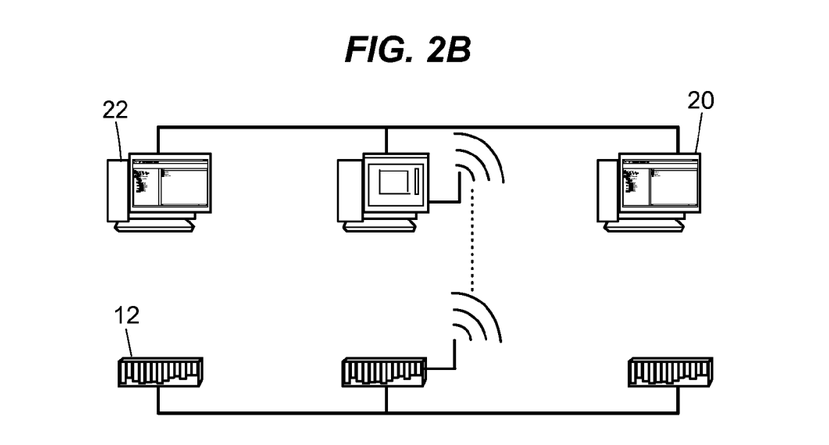

Referring to FIGS. 2A and 2B, examples of wireless networks are shown at the area control network 28 between the workstations 20, 22 and the controllers 12, although it should be understood that a wireless network may be deployed throughout the process control system at any point and the unified application programming interface is equally applicable to any wireless network throughout the process control system. In the examples of FIGS. 2A and 2B, a wireless network, such as a mesh network, is implemented in the area control network 24 between the workstations 20, 22 and the controllers 12. In particular, with the wireless network of FIG. 2A all communications among the distributed nodes are wireless. On the other hand, with the wireless network of FIG. 2B, there is only one wireless connection between a workstation 20, 22 and a controller 12, where the workstations 20, 22 are interconnected by a wireline network and the controllers 12 are interconnected by a wireline network so as to reduce wireless exposure and provide better data quality. However, it should be understood that different combinations of wireline and wireless networks may be used, including, but not limited to, a wireless network among the field devices 14, 16 and a wireline network among the controllers 12 and the workstations 20, 22. In another example, a wireless network may be deployed among any of the controllers 12, the field devices 14, 16 and on the workstations 20, 22 along with an underlying wireline network deployed across all or part of the process control system, so as to provide network redundancy.

The deployment of a wireless network anywhere within a process control system results in multiple wireless process control system nodes that transmit and receive data, such as configuration data, control data, monitoring data, alarm/event data, etc. across the wireless network. For example, with a wireless network as the area control network 28 between the controllers 12 and the workstations 20, 22, each of the controllers 12 and workstations 20, 22 may correspond to a process control system node. A wireless area control network 28 may be developed as part of the process control system similar to a wireline version of the area control network using any of a variety of wireless standards. Existing wireless area control networks 28, or other wireless networks within the process control system, may be replaced with a different wireless system having a different wireless standard, or different wireless standards may be used throughout the process control system depending on the network's purpose.

With a wireless network between the field devices 14, 16 and the controllers 12, each of the field devices 14, 16, or each of the associated I/O devices, may correspond to a process control system node. While each of the process control nodes may communicate with the physical network, one or a few process control nodes within a wireless network may be dedicated as a communications gateway node. The gateway node may act as a control node for the wireless network and facilitate communication between different networks, such as between the controllers 12 and the workstations 20, 22 or between the field devices 14, 16 and the controllers 12. For example, as shown in the wireless network of FIG. 2B, one or a few of the controllers 12 may act as a gateway node for the controllers 12. The gateway node for the controllers 12 engages in wireless communication with one or a few of the workstations 20, 22 which in turn acts as a gateway node for the workstations 20, 22.

Figure 3:
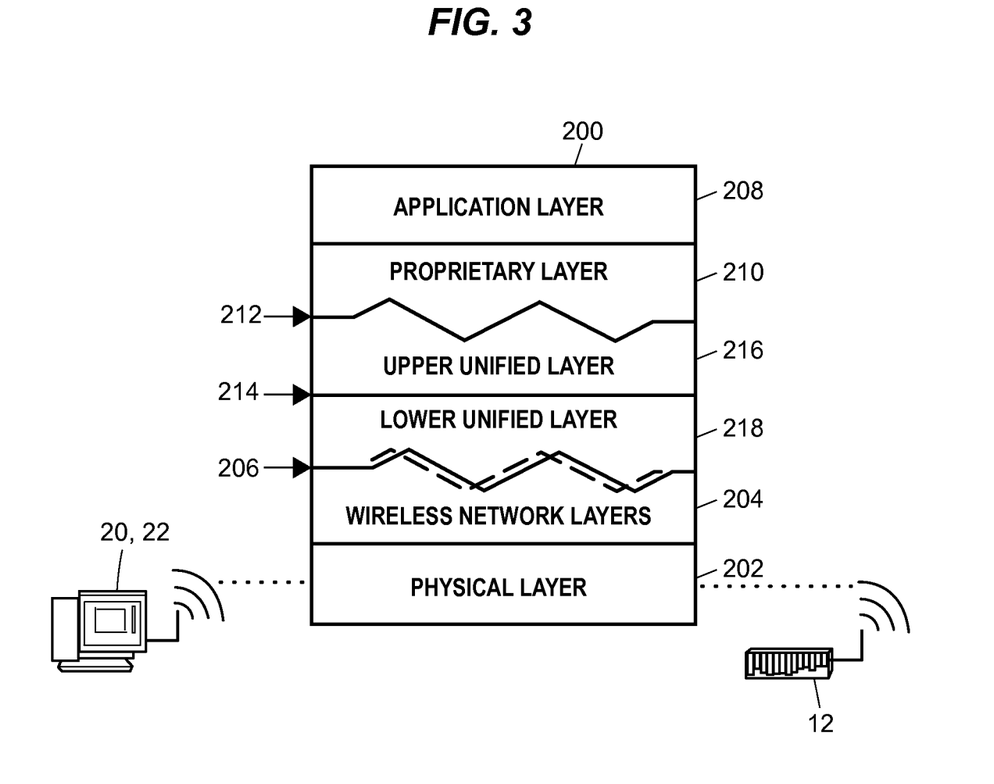
FIG. 3 is a schematic diagram of communication layers implementing a unified application programming interface for a process control node.

Referring to FIG. 3, an example of the wireless communication layers 200 used in the process control nodes are shown. In particular, each process control node, such as a controller 12 or a workstation 20, 22 or control nodes thereof, may include a network communication device that implements the wireless communication layers shown in FIG. 3 and facilitates communication between the process control nodes across the wireless network. As shown in FIG. 3, the lower layers of the wireless communication layers 200 include a physical layer 202 at the wireless level for communications between process control nodes, and a wireless network layer 204 which implements a wireless network application programming interface 206 of the wireless network.

The upper layers of the wireless communications layers 200 include an application layer 208 to interface with one or more applications, such as applications executed on the workstations 20, 22. The application layer 208 facilitates calls between an application of the process control node, such as an application of a workstation 20, 22 or the control software of the controllers 12, and a proprietary layer 210 of the control system that process control system resides in. The proprietary layer 210 implements a proprietary application programming interface 212 of the control system.

When implementing a wireless communication network for a process control system, a basic commercial wireless network, such as a commercial off-the-shelf wireless network may be utilized. Because of varying wireless communication protocol standards, different wireless network providers may each have their own application programming interface 206. Likewise, the control system on each side of the wireless network, such as the controllers 12, the workstations 20, 22 and applications thereof, may have its own application programming interface 212, which may be proprietary to the process control system. For example, an area control network 28 may utilize standard wireless network communication protocols at the lower layers 202, 204 which merge seamlessly with the wireless network and utilize proprietary communication protocols in the upper layers 208, 210 which merge seamlessly with the control system.

In order to interface the upper and lower layers and to accommodate different wireless standards, the communication layers 200 further include a unified application programming interface 214. An upper unified layer 216 translates various data requests, such as various transmission requests, from the proprietary application programming interface 212 into the unified application programming interface 214. A lower unified layer 218 translates methods of the unified application programming interface into methods of the wireless network application programming interface 206. It should be understood that translating the methods may involve using parameters of a method of a first application programming interface and utilizing those parameters in one or more corresponding methods of a second application programming interface, which may be accomplished by establishing a map between the methods of the first application programming interface, such as the unified application programming interface 214, and the methods of the second application programming interface, such as the wireless network application programming interface 206 or the proprietary application programming interface 212.

Most or all communications between the wireless application programming interface 206 and the proprietary application programming interface 212 are facilitated by the upper unified layer 216, the lower unified layer 218 and the unified application programming interface 214. As such, the wireless application programming interface 206 is separated from the development of the proprietary application programming interface 212, and the wireless application programming interface 206 and the proprietary application programming interface 212 generally do not require any knowledge of the other.

The unified application programming interface 214 contains a set of methods which may be used for most of the types of data traffic across the wireless network, such as the categories for configuration, control, monitor, alarm/event and information retrieval disclosed above. The set of methods for the unified application programming interface 214 is generally small so as to provide easy support for requests from the upper layers 208, 210 and are generic in order to be supported by any wireless network protocol. For example, the unified application programming interface may include only three methods: read, write and respond. The following provides examples of the schemas used for the unified application programming interface. Although C++ style notation is used to described the schemas, the schemas are not limited thereto.

Read—This method is used to read a data item from another process control node, such as a controller 12 or workstation 20, 22.

```
Syntax
    unsigned long Read ( unsigned char * nodeName,
                         unsigned char * dataPath,
                         unsigned long timeOut,
                         unsigned char * dataBuffer)
```

Write—This method writes a data value to another process control node.

```
Syntax
    unsigned long Write ( unsigned char * nodeName,
                          unsigned char * dataPath,
                          unsigned long timeOut,
                          unsigned char * dataBuffer)
```

Respond—This method is used to handle read and write requests from another process control node.

```
Syntax
    unsigned long Response (unsigned long requestType,
                            unsigned char * dataPath,
                            unsigned char * dataBuffer)
```

The return value is an integer for all three methods, Read, Write and Respond. The integer defines the execution status of the method. The unified application programming interface 214 further defines two network error statuses: timeout and transmission failure. The return values and the network error statuses may be used to provide delivery guarantees depending on the communication type, as disclosed above. The control system may define all other success and failure statuses. The following parameters or arguments may be the same for all three of the above methods:

| | Arguments |
|---|---|
| nodeName | The name of the process control node. |
| dataPath | The unique path string to identify the data item in the process control node. The path string may be defined by the process control system. |
| timeOut | Timeout value for the Read/Write request. A timeout error will be returned if the request could not be finished in time. For example, INFINITE (0xFFFFFFFF) means the caller is blocked until the method has an error or is finished. "0" may only be allowed in the Write method for an immediate return without acknowledgment. If not "0", both Read and Write methods will wait for the receiving node to reply before return. |
| dataBuffer | Points to a caller supplied buffer of MAX_BUFFER_SIZE bytes. The caller and callee may typecast the data value to and from unsigned char. |
| requestType | "0" may refer to a Read request, and "1" may refer to a Write request. |

Figure 4:
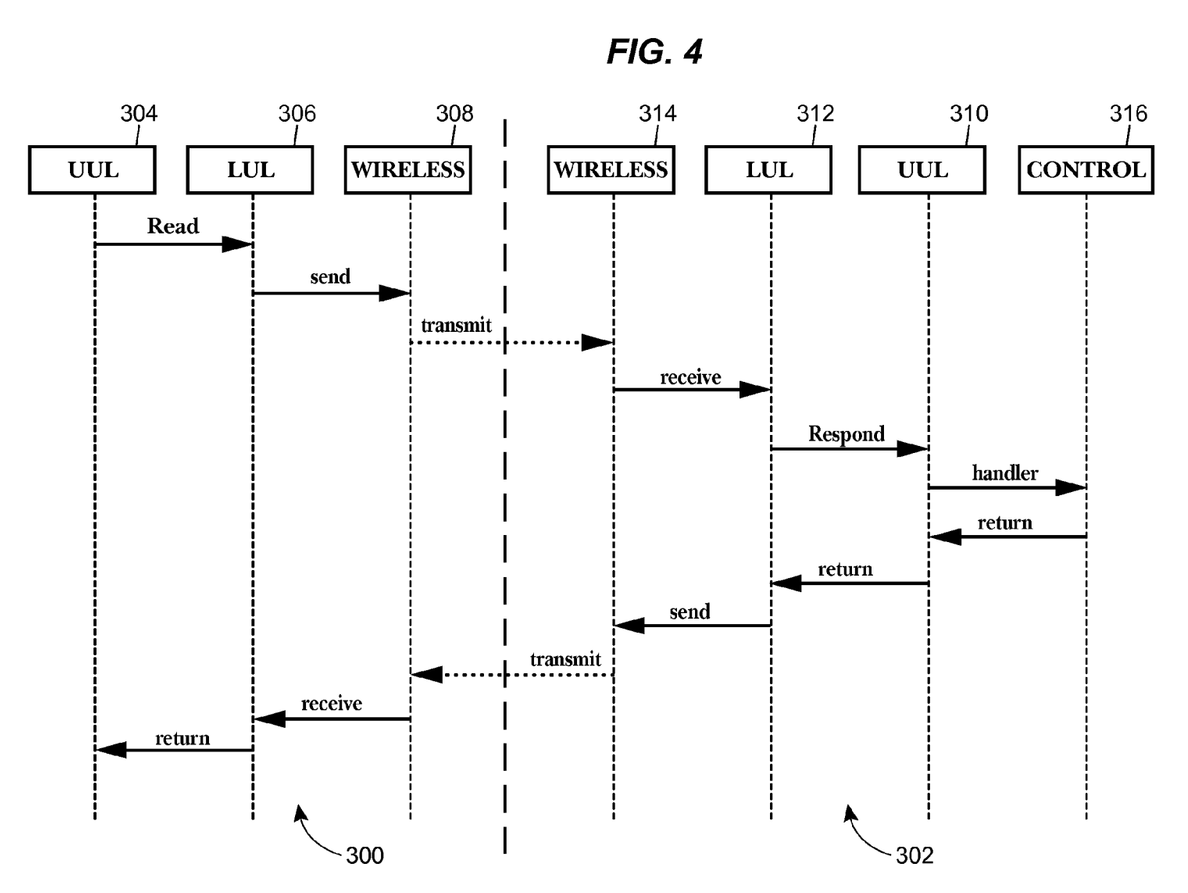
FIG. 4 is a sequence diagram of a read method of the unified application programming interface.
Figure 5:
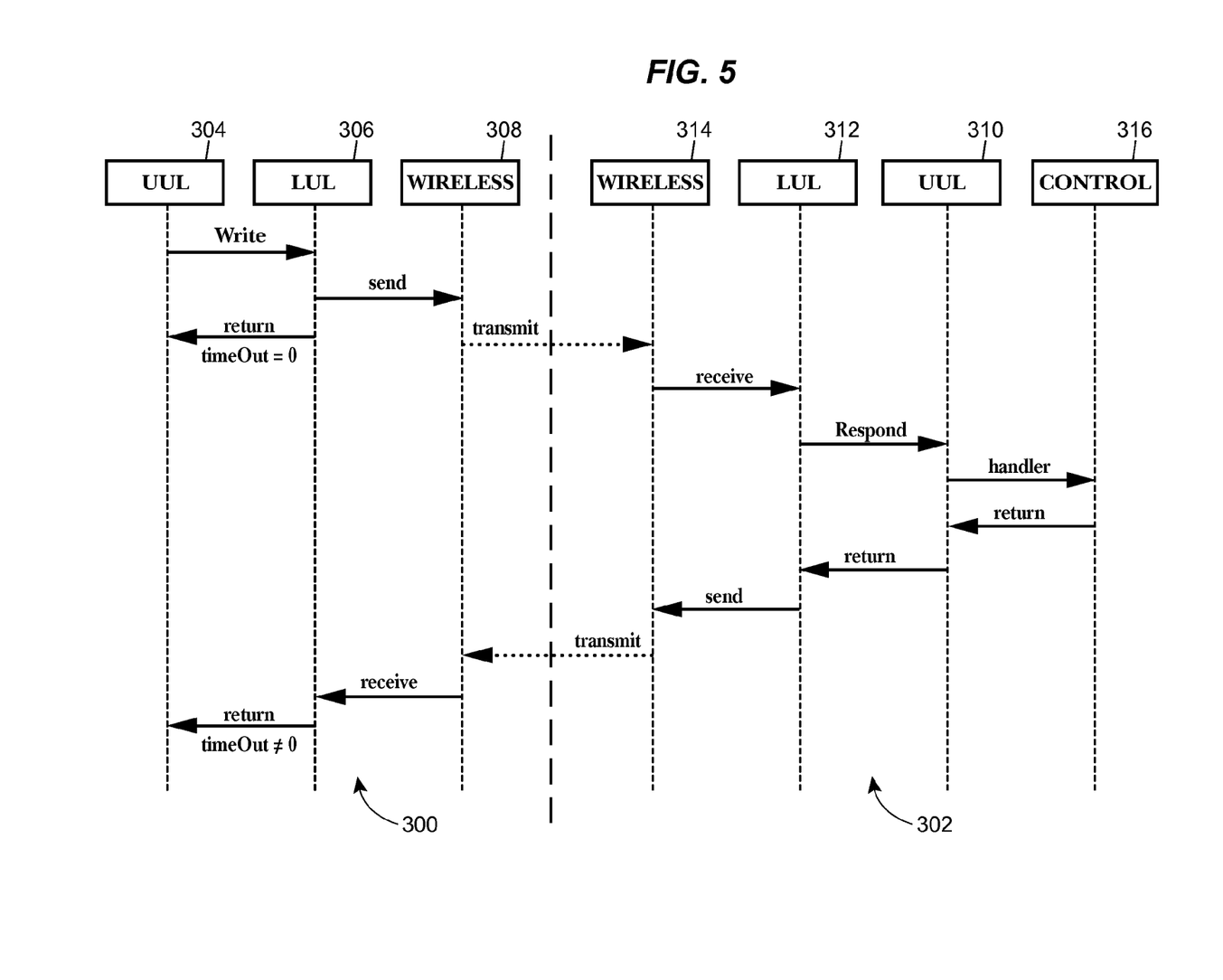
FIG. 5 is a sequence diagram of a write method of the unified application programming interface.

The process control system calls Read and Write methods to transmit data in response to a data request, such as a transmission or access request. FIG. 4 depicts an example of a sequence diagram for the Read method and FIG. 5 depicts an example of a sequence diagram for the Write method. Referring to FIGS. 4 and 5, the first process control node 300 includes a network communication device that implements the communication layers described above, including an upper unified layer (UUL) 304, a lower unified layer (LUL) 306 and a wireless network layer 308. Likewise, the second process control node 302 includes a network communication device that implements the communication layers, including an upper unified layer (UUL) 310, a lower unified layer (LUL) 312 and a wireless network layer 314. For demonstration purposes, the proprietary layer 316 is also shown with the second process control node 302, although it should be understood that the first process control node 300 may likewise include a proprietary layer as both the process control nodes 300, 302 are operatively coupled to the wireless network and to the proprietary control system.

Referring to FIG. 4, the first process control node 300 engages in a data request to read a data item from the second process control node 302. The upper unified layer 304 processes a call received from the first process control node 300 via the proprietary application programming interface of the control system and issues a call for the Read method. In particular, the call relates to a data request from the process control node 300 and the upper unified layer 304 translates the data request from the proprietary application programming interface into the Read method of the unified application programming interface.

The lower unified layer 306 implements the Read method of the unified application programming interface with the wireless layer 308 of the wireless network application programming interface. In particular, the lower unified layer 306 translates the Read method of the unified application programming interface into one or more methods of the wireless network application programming interface, and calls the translated Read method into the wireless network application programming interface with the translated method. The wireless layer 308 issues an access request in response to implementing the translated Read method. The wireless layer 308 then transmits the access request via the physical layer from the first process control node 300 to the second process control node 302 to request the data from the second process control node 302.

The wireless layer 314 of the second process control node 302 receives the access request via the physical layer and issues a call to the lower unified layer 312. The lower unified layer 312 determines that the call relates to a read request from the first process control node 300 and calls the Respond method in the upper unified layer 310. The upper unified layer 310 implements the Respond method with the proprietary layer 316 by implementing the Respond method in the proprietary application programming interface. In particular, the upper unified layer 310 translates the Respond method from the unified application programming interface into a corresponding method of the proprietary application programming interface which handles the request to read a data item and respond to the first process control node 300.

The control system issues a call via the proprietary application programming interface to return the requested data item to the upper unified layer 310, which returns the response to the lower unified layer 312. The lower unified layer 312 sends the response to the wireless layer 314, and the wireless layer 314 transmits the response via the physical layer to the wireless layer 308 of the first process control mode.

The wireless layer 308 issues a call to the lower unified layer 306 indicating receipt of the requested data item. The lower unified layer 306 determines the call relates to a return of the Read method, calls into the upper unified layer 304 and returns the requested data item. The upper unified layer 304 then provides the requested data item to the first process control node 300.

Referring to FIG. 5, the first process control node 300 engages in a data request to write a data item to the second process control node 302. The upper unified layer 304 process a call received from the first process control node 300 via the proprietary application programming interface of the control system and issues a call for the Write method. As above, the upper unified layer 304 translates the data request from the proprietary application programming interface into the Write method of the unified application programming interface. If the timeOut value is set to provide an immediate return and the write request is not finished within the allotted time, the timeOut value may be immediately returned to the upper unified layer 304 without acknowledgement.

The lower unified layer 306 implements the Write method of the unified application programming interface with the wireless layer 308 of the wireless network application programming interface. Similar to the Read sequence, the lower unified layer 306 translates the Write method of the unified application programming interface into one or more methods of the wireless network application programming interface, and calls the translated Write method into the wireless network application programming interface with the translated method. The wireless layer 308 issues an access request in response to implementing the translated Write method, and transmits the access request via the physical layer from the first process control node 300 to the second process control node 302 to write the data to the second process control node 302.

The wireless layer 314 of the second process control node 302 receives the access request via the physical layer and issues a call to the lower unified layer 312. The lower unified layer 312 determines that the call relates to a write request from the first process control node 300 and calls the Respond method in the upper unified layer 310. The upper unified layer 310 implements the Respond method with the proprietary layer 316 by implementing the Respond method in the proprietary application programming interface. In particular, the upper unified layer 310 translates the Respond method from the unified application programming interface into a corresponding method of the proprietary application programming interface which handles the request to write the data item to the second process control node 302.

The control system issues a call to the upper unified layer 310 via the proprietary application programming interface to issue a return value. The upper unified layer 310 issues the return value to the lower unified layer 312. The lower unified layer 312 sends the return value to the wireless layer 314, and the wireless layer 314 transmits the return value via the physical layer to the wireless layer 308 of the first process control mode.

The wireless layer 308 issues a call to the lower unified layer 306. The lower unified layer 306 determines the call relates to a return of the Write method and returns the return value to the upper unified layer 304 provided the timeOut value was set to wait for the receiving node to reply before issuing a return value of the Read method.

As indicated above, the upper unified layer 216 works as an intermediary between the proprietary application programming interface 212 of the control system and the unified application programming interface 214. In particular, the upper unified layer 216 translates different data requests (e.g., configuration download/upload, control, monitor, alarm/ event, information retrieval, etc.) into Read and/or Write methods of the unified application programming interface 214. The lower unified layer 218 implements the Read and/or Write methods with the wireless network application programming interface 206 by translating the Read and Write methods from the unified application programming interface 214 to the wireless network application programming interface 206 and calling into the wireless network application programming interface 206.

As also indicated above, the lower unified layer 218 works as an intermediary between the unified application programming interface 214 and the wireless network application programming interface 206. In particular, the lower unified layer 218 receives calls via the wireless network application programming interface 206, and checks if the call relates to a return of a locally issued Read or Write request, or if the call relates to a request from another process control node. If the call relates to a return of a locally issued Read or Write request, the lower unified layer 218 returns the pending Read/ Write call. If the call relates to a request from another process control node, the lower unified layer 218 calls the Respond method in the upper unified layer 216, and when a return to the Respond method is received, the lower unified layer 218 forwards the reply to the wireless layer 204. The upper unified layer 216 implements the Respond method with the proprietary application programming interface 212 by translating the Respond method from the unified application programming interface 214 to the proprietary application programming interface 212 and calling into the proprietary application programming interface 212.

Examples of translating various types of data traffic within an area controlled network between a process controller 12 and a workstation 20, 22, such as configuration download/ upload, control, monitor, alarm/event and information retrieval, into the Read and Write methods, and implementing the Respond method are provided below:

Configuration Download/Upload

Upon a request to download a configuration to a process controller (e.g., CTLR1), the upper unified layer 216 calls the Write method ("CTRL1", "", INFINITE, pConfig). pConfig points to the string of the configuration. The second parameter may point to some object in the process controller CTLR1 to download that object only.

In the process controller CTLR1, the lower unified layer 218 calls Respond(1, "", pBuffer) into the upper unified layer 216, which calls into the appropriate method in the control system. "pBuffer" points to the configuration data received from a workstation 20, 22. If the configuration is larger than MAX_BUFFER_SIZE, the configuration data is broken into segments and the Write method is called more than once. The upper unified layer 216 on both the process controller CTRL1 and a workstation 20, 22 coordinate on how to break and recombine the segments. To upload a configuration, the upper unified layer 216 of the process controller CTRL1 calls the Read method, for example Read("CTRL1", "", INFINITE, pConfig).

Control

Upon a request commanding a change in a process control value, such as a set point in a process control loop (e.g., MODULE1/PID/SP.CV) in a process controller (e.g., CTRL1), the upper unified layer 216 calls Write("CTRL1", "MODULE1/PID/SP.CV", INFINITE, (unsigned char *)pValue). "pValue" points to the process control value to be changed, such as the set point value.

In the process controller CTRL1, the lower unified layer 218 calls Respond(1, "MODULE1/PID/SP.CV", pBuffer) into the upper unified layer 216. The upper unified layer 216 forwards the call to the control system via the proprietary application programming interface.

Monitor

For a process controller (e.g., CTRL1) data item (e.g., MODULE1/AO/PV.CV) displayed on a workstation (e.g., WS1), the process controller upper unified layer 216 calls Write("WS1", "MODULE1/AO/PV.CV", 30, (unsigned char *)pValue) whenever the process controller sends out an update. "30" is a process controller execution rate. "pValue" points to the data value.

In the workstation (WS1), the lower unified layer 218 calls Respond(1, MODULE1/AO/PV.CV", pBuffer) into the upper unified layer 216. The upper unified layer 216 calls into the workstation WS1 to update the display.

Alarm/Event

When the process controller generates an alarm or event, it calls into the upper unified layer 216, which in turn calls Write("WS1", pPath, INFINITE, (unsigned char *)pValue) for an alarm and Write("WS1", pPath, 0, (unsigned char *)pValue) for an event. "WS1" is the workstation that registers the alarm or event. "pPath" is the alarm or event item path.

In the workstation WS1, the lower unified layer 218 calls Respond(1, pPath, pBuffer) into the upper unified layer 216. The upper unified layer 216 calls into the workstation WS1 to set or reset of the alarm or event.

Information Retrieval

Upon a request to read a data value (e.g., MODULE1/AO/ PV.CV) from a process controller (e.g., CTRL1), the upper unified layer 216 calls method Read("CTRL1", "MODULE1/AO/PV.CV", INFINITE, pBuffer).

In the process controller CTRL1, the lower unified layer 218 calls Respond(0, "MODULE1/AO/PV.CV", pBuffer) into the upper unified layer 216. The upper unified layer 216 calls into the appropriate method in the process control system. Once the value is returned, the Respond method returns and the value is forwarded to the lower unified layer 218 of the workstation, which returns the Read method.

The wireless layers 204 may be different for different wireless standards. For example, IEEE 802 standards define the physical layer and the datalink layer. ZigBee and Bluetooth also define higher layers. Which one to select a may depend on how hard it is to implement the lower unified layer 218. The higher the layer, the simpler the lower unified layer 218 could be. As indicated in FIGS. 4 and 5, the unified application programming interface to 14 may be realized with simple send and receive commands. For a process control system developed using this unified API, switching wireless networks requires only switching the lower unified layer 218.

Accordingly, the control system development is separated from the underlying wireless network by providing separate upper and lower unified layers 216, 218 and a unified application programming interface 214 with a small set of methods sufficient to support most communication requests from the control system and guarantees returns as desired. The upper and lower unified layers 216, 218 and the unified application programming interface 214 are developed according to the application programming interfaces of the control system and the wireless network, and not vice versa. As such, different wireless standards may be utilized for communication among workstations and controllers in a process control system. The majority of the process control systems may remain proprietary, as the proprietary application programming interface and the process control system itself remain unchanged. Further, the wireless standards and the wireless network application programming interface used by the wireless network may remain unchanged. Instead, the unified layers 216, 218 and the unified application programming interface 214 inject a translation layer between the proprietary process control system and the supporting wireless network. The upper unified layer 216 may be replaced or changed based upon changes to the process control system, and the lower unified layer 218 may be replaced or changed based upon changes to the wireless network.

The upper unified layer 216 translates proprietary transmission requests into the unified application programming interface methods, and implements access requests from other nodes by calling into the proprietary process control system. The lower unified layer 218 translates the unified application programming interface into application programming interfaces supported by the underlying wireless standard, and processes access requests from the underlying wireless layer by calling into the handling method in the upper unified layer 216.

The upper and lower unified layers 216, 218 and the unified application programming interface allowed different wireless standards to be switched in and out of the process control system. In particular, when switching wireless standards, only the lower unified layer 218 is switched out. As such, process control systems may be updated with wireless networks and wireless standards that are best suited for the process control system.

It should be noted that the schema defined herein may support all possible standards for wireless networks, including personal area networks, local area networks, wide area networks and cellular phone/satellite networks, and may be further applied to future wireless standards or proprietary wireless networks. Still further, the schema could be applied to wireline networks and to switch proprietary process control systems by replacing the upper unified layer 216.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method of communicating between first and second process control nodes of a process control network via a wireless communication network, the method comprising:
   implementing a first process control application at the first process control node, and a second process control application at the second process control node;
   implementing a proprietary application programming interface, a wireless network application programming interface, and a unified application programming interface at both the first and second process control nodes, the unified application programming interface communicatively coupled to an upper unified layer and to a lower unified layer, wherein the upper unified layer is communicatively coupled to the proprietary application programming interface and the lower unified layer is communicatively coupled to the wireless network application programming interface;
   initiating a data request at the first process control node from the first process control application to the second process control application;
   initiating a call for the data request from the proprietary application programming interface of the first process control node to the unified application programming interface of the first process control node;
   translating, by the upper unified layer of the first process control node, the data request from the proprietary application programming interface of the first process control node into one or more methods of the unified application programming interface of the first process control node;
   implementing, by the lower unified layer of the first process control node, the one or more methods of the unified application programming interface of the first process control node in the wireless network application programming interface of the first process control node;
   communicating the data request from the first process control node to the second process control node over the wireless communication network;
   receiving the data request at the second process control node;
   initiating a data request response call from the wireless network application program interface of the second process control node to the unified application programming interface of the second process control node;
   translating, by the lower unified layer of the second process control node, the data request response from the wireless network application programming interface of the second process control node into one or more methods of the unified application programming interface of the second process control node; and
   implementing, by the upper unified layer of the second process control node, the one or more methods of the unified application programming interface of the second process control node in the proprietary application programming interface of the second process control node, to thereby communicate the data request to the second process control application.

2. The method of claim 1, wherein implementing, by the lower unified layer of the first process control node, the one or more methods of the unified application programming interface of the first process control node in the wireless network interface with a second application programming interface of the first process control node comprises:
   translating the one or more methods of the unified application programming interface to one or more methods of the wireless network application programming interface; and
   calling into the wireless network application programming interface with the translated one or more methods of the unified application programming interface.

3. The method of claim 1, wherein the second process control node comprises a process controller and wherein translating, by the upper unified layer of the first process control node, the data request from the proprietary application programming interface of the first process control node comprises translating a request for the first application to download process control configuration data to a process controller and wherein implementing, by the lower unified layer of the first process control node, the one or more methods of the unified application programming interface in the wireless network application programming interface comprises:
   issuing a call to a write method of the unified application programming interface of the first process control node, wherein the call identifies the process control configuration data and identifies an object in the process controller for downloading the process control configuration data;
   translating the write method to a method of a wireless network application programming interface of the first process control node; and
   calling into the wireless network application programming interface of the first process control node with the translated write method.

4. The method of claim 1, wherein translating, by the lower unified layer of the second process control node, the data request from the wireless network programming interface of the second process control node into one or more methods of the unified application programming interface of the second process control node comprises translating a request from the wireless network application programming interface of the second process control node to download a process control configuration to the process controller of the process control network, and wherein implementing, by the upper unified layer of the second process control node, the one or more methods of the unified application programming interface of the second process control node in the proprietary application programming interface of the second process control node comprises:

issuing a call to a respond method of the unified application programming interface of the second process control node for the process controller, wherein the call calls into a method of the second process control application to implement the process control configuration and identifies the process control configuration data received from the first process control application;

translating the respond method to a method of the proprietary application programming interface of the second process control node for the process controller; and     calling into the proprietary application programming interface of the second process control node with the translated respond method.

5. The method of claim 1, wherein translating, by the upper unified layer of the first process control node, the data request from the proprietary application programming interface of the first process control node into one or more methods of the unified application programming interface of the first process control node comprises translating a request from the proprietary network application programming interface for the first process control application to command a process controller of the process control network to change a process control value of the control system, and wherein implementing, by the lower unified layer of the first process control node, the one or more methods of the unified application programming interface of the first process control node in the wireless network application programming interface of the first process control node comprises:

issuing a call to a write method of the unified application programming interface of the first process control node for the process control application, wherein the call identifies the process control value to be changed;

translating the write method of the unified application programming interface to a method of the wireless network application programming interface of the first process control node; and     calling into the wireless network application programming interface of the first process control node with the translated write method.

6. The method of claim 1, wherein translating, by the lower unified layer of the second process control node, the data request from the wireless network application programming interface of the second process control node into one or more methods of the unified application programming interface of the second process control node comprises translating a request from the wireless network application programming interface of the second process control node to command a process controller of the process control network to change a process control value of the control system, and wherein implementing, by the upper unified layer of the second process control node, the one or more methods of the unified application programming interface of the second process control node in the proprietary application programming interface of the second process control node comprises:

issuing a call to a respond method of the unified application programming interface of the second process control node for the process controller, wherein the call forwards a call to a write method from the wireless network application programming interface of the second process control node to change the process control value of the control system;

translating the respond method to a method of the proprietary application programming interface of the second process control node for the process controller; and     calling into the proprietary application programming interface with the translated respond method.

7. The method of claim 1, wherein translating, by the upper unified layer of the first process control node, the data request from the proprietary application programming interface of the first process control node into one or more methods of the unified application programming interface of the first process control node comprises translating a request from the proprietary network application programming interface for a process controller of the control network to transmit process control data to the second process control application, and wherein implementing, by the lower unified layer of the first process control node, the one or more methods of the unified application programming interface of the first process control node in the wireless network application programming interface comprises:

issuing a call to a write method of the unified application programming interface of the first process control node for the process controller, wherein the call identifies a value of the process control data;

translating the write method to a method of the wireless network application programming interface of the first process control node; and     calling into the wireless network application programming interface of the first process control node with the translated write method.

8. The method of claim 1, wherein translating, by the lower unified layer of the second process control node, the data request from the wireless network application programming interface of the second process control node into one or more methods of the unified application programming interface of the second process control node comprises translating a request from the wireless network application programming interface of the second process control node to receive process control data from a process controller of the process control network and wherein implementing, by the upper unified layer of the second process control node, the one or more methods of the unified application programming interface of the second process control node in the proprietary application programming interface of the second process control node comprises:

issuing a call to a respond method of the unified application programming interface of the second process control node for a process control application, wherein the call calls into the process control application to update a display of process control data;

translating the respond method to a method of the proprietary application programming interface of the second process control node for the process control application; and     calling into the proprietary application programming interface of the second process control node with the translated respond method.

9. The method of claim 1, wherein translating, by the upper unified layer of the first process control node, the data request from the proprietary application programming interface of the first process control node into one or more methods of the unified application programming interface of the first process control node comprises translating a request from the proprietary network application programming interface for a process controller of the process control network to transmit process of at least one of alarm and event data to the first process control application, and wherein implementing, by the lower unified layer of the first process control node, the one or more methods of the unified application programming interface with the wireless network application programming interface comprises:

issuing a call to a write method of the unified application programming interface of the first process control node for the process controller, wherein the call identifies an alarm or event item path;
   translating the write method to a method of the wireless network application programming interface of the first process control node; and
   calling into the wireless network application programming interface of the first process control node with the translated write method.

10. The method of claim 1, wherein translating, by the lower unified layer of the second process control node, the data request from the wireless network application programming interface of the second process control node into one or more methods of the unified application programming interface of the second process control node comprises translating a request from the wireless network application programming interface of the second process control node to receive process of at least one of alarm or event data from a process controller of the process control network and wherein implementing, by the upper unified layer of the second process control node, the one or more methods of the unified application programming interface of the second process control node with the proprietary application programming interface of the second process control node comprises:

issuing a call to a respond method of the unified application programming interface of the second process control node for the second process control application, wherein the call calls into the second process control application to update a display of of at least one of alarm or event data;
   translating the respond method to a method of the proprietary application programming interface of the second process control node for the second process control application; and calling into the proprietary application programming interface of the second process control node with the translated respond method.

11. The method of claim 1, wherein translating, by the upper unified layer of the first process control node, the data request from the proprietary application programming interface of the first process control node into one or more methods of the unified application programming interface of the first process control node comprises translating a request from the proprietary network application programming interface for a process control application to retrieve data from a process controller of the process control network and wherein implementing, by the lower unified layer of the first process control node, the one or more methods of the unified application programming interface of the first process control node with the wireless network application programming interface of the first process control node comprises:

issuing a call to a read method of the unified application programming interface of the first process control node for the process control application, wherein the call identifies the data to be retrieved;
   translating the read method to a method of the wireless network application programming interface of the first process control node; and
   calling into the wireless network application programming interface of the first process control node with the translated read method.

12. The method of claim 1, wherein translating, by the lower unified layer of the second process control node, the data request from the wireless network application programming interface of the second process control node into one or more methods of the unified application programming interface of the second process control node comprises translating a request from the wireless network application programming interface of the second process control node to retrieve data from a process controller of the process control network and wherein implementing, by the upper unified layer of the second process control node, the one or more methods of the unified application programming interface of the second process control node with the proprietary application programming interface of the second process control node comprises:

issuing a call to a respond method of the unified application programming interface of the second process control node for a process controller, wherein the call calls into a method of the control system to read data from the process controller and identifies the data to be retrieved;
   translating the respond method to the method of a proprietary application programming interface of the second process control node for the process controller; and
   calling into the proprietary application programming interface of the second process control node with the translated respond method.

13. The method of claim 1, wherein at least one of the one or more methods of the unified application programming interface of the first process control node comprises a read method for reading a data item from a network node within the process control network.

14. The method of claim 1, wherein at least one of the one or more methods of the unified application programming interface of the first process control node comprises a write method for writing a data item to a network node within the process control network.

15. The method of claim 1, wherein at least one of the one or more methods of the unified application programming interface of the second process control node comprises a respond method for responding to read request or a write request from a network node within the process control network.

16. A network communication device of a first process control node comprising: a memory having a communication layer for a wireless network within a process control system, wherein the communication layer comprises:

an upper unified layer stored in the memory and communicatively coupled to a proprietary application programming interface of the process control system and to a unified application programming interface, the upper unified layer arranged to interact with the proprietary application programming interface and to implement one or more first methods in the proprietary application programming interface; and
   a lower unified layer stored in the memory and communicatively coupled to a wireless network application programming interface of the wireless network and to the unified application programming interface, the lower unified layer arranged to interact with the wireless network application programming interface and to implement one or more second methods in the wireless network application programming interface, wherein the upper unified layer is further arranged to receive a transmission request from an application executed at the first process control node via the proprietary application programming interface and translate the transmission request into one of the second methods of the lower unified layer, wherein the lower unified layer is further arranged to implement the second method on the wireless network application programming interface such that the transmission request is transmitted from the first process control node to a second process control node over the wireless communication network, wherein the lower unified layer is further arranged to receive a data access request from the wireless network application programming interface based on a transmission received from the second process control node and translate the data access request into one of the first methods of the upper unified layer, and wherein the upper unified layer is further arranged to implement the first method in the proprietary application programming interface such that the data access request is processed by the application executed at the first process control node.

17. The network communication device of claim 16, wherein the lower unified layer is arranged to translate methods of the unified application programming interface into methods of the wireless network application programming interface and further arranged to call the translated methods into the wireless network application programming interface.

18. The network communication device of claim 16, wherein the wireless network in the process control system comprises an area control network, wherein the upper unified layer is arranged to receive a transmission request from the proprietary application programming interface of at least one of the group consisting of: a process control application or a process controller.

19. The network communication device of claim 16, wherein the unified application programming interface comprises a read method and a write method, wherein the upper unified layer is arranged to translate the transmission request into one or more of the read and write methods, and wherein the lower unified layer is arranged to implement the one or more of the read and write methods with the wireless network application programming interface.

20. The network communication device of claim 16, wherein the lower unified layer is further arranged to call a method of the unified application programming interface into the upper unified layer, and wherein the upper unified layer is further arranged to implement the method of the unified application programming interface called by the lower unified layer.

21. The network communication device of claim 20, wherein the unified application programming interface comprises a response method, wherein the lower unified layer is arranged to translate the access request into the response method and wherein the upper unified layer is arranged to implement the response method with the proprietary application programming interface.

22. The network communication device of claim 20, wherein the upper unified layer is arranged to translate the method of the unified application programming interface called by the lower unified layer and further arranged to call the translated method into the proprietary application programming interface.

23. A process control system within a process plant control comprising:

a first process control node and a second process control node coupled by a wireless communication network;

a first process control application executed at the first process control node;

a first network communication device associated with the first process control node executing a first proprietary application programming interface interacting with the first process control application, a first wireless network application programming interface interacting with the wireless communication network, and a first unified application programming interface having an upper unified layer adapted to interact with the proprietary application programming interface and a lower unified layer adapted to implement one or more methods in the first wireless network application programming interface; and a second process control application executed at the second process control node;

a second network communication device associated with the second process control node executing a second wireless network application programming interface for interacting with the wireless communication network, a second proprietary application programming interface for interacting with the second process control application, and a second unified application programming interface having a lower unified layer adapted to interact with the second wireless network application programming interface and an upper unified layer adapted to implement one or more methods in the second proprietary application programming interface, wherein the upper unified layer of the first unified application programming interface of the first network communication device is adapted to receive a transmission request from the application executed at the first process control node via the first proprietary application programming interface and translate the transmission request into one of the methods of the lower unified layer of the first unified application programming interface, and the lower unified layer of the first unified application programming interface is adapted to implement the method on the first wireless network application programming interface such that the transmission request is transmitted from the first process control node to the second process control node over the wireless communication network; and wherein the second communication device is adapted to receive the transmission and the lower unified layer of the second unified application programming interface is adapted to receive a data access request from the second wireless network application programming interface based on the received transmission and translate the access request into one of the methods of the upper unified layer of the second unified application programming interface and the upper unified layer of the second unified application interface is adapted to implement the method in the second proprietary application programming interface such that the data access request is processed by the second process control application.

24. The system of claim 23, wherein the first process control node comprises a process control workstation and the second process control node comprises a process controller.

25. The system of claim 23, wherein the wireless network comprises a wireless area control network.

26. The system of claim 23, wherein the transmission request comprises a request to download a process control configuration from the first process control node to the second process control node, wherein the first network communication device is adapted to translate the request into the write method and adapted to implement the write method in the wireless network application programming interface.

27. The system of claim 23, wherein the transmission request comprises a request to command a change in a process control value from the first process control node to the second process control node, wherein the first network communication device is adapted to translate the request into the write method and adapted to implement the write method in the wireless network application programming interface.

28. The system of claim 23, wherein the transmission request comprises a request to transmit process control data relating to the status of an entity in the process control system from the first process control node to the second process control node, wherein the first network communication device is adapted to translate the request into the write method and adapted to implement the write method in the wireless network application programming interface.

29. The system of claim 23, wherein the transmission request comprises a request to transmit an alarm or event from the first process control node to the second process control node, wherein the first network communication device is adapted to translate the request into the write method and adapted to implement the write method in the wireless network application programming interface.

30. The system of claim 23, wherein the transmission request comprises a request from the first process control node to read data from the second process control node, wherein the first network communication device is adapted to translate the request into the read method and adapted to implement the read method in the wireless network application programming interface.

31. A method of communicating between a requesting process and a serving process supporting communication in a process control system comprising:

issuing, by the requesting process, a first call to a transmission request from a first process control application executed at a first process control node via a first proprietary application programming interface implemented at the first process control node to an upper unified layer implemented at the first process control node, wherein the upper unified layer implemented at the first process control node is communicatively coupled to the first proprietary application programming interface and the first proprietary application programming interface interacts with the first process control application;

issuing, by the upper unified layer implemented at the first process control node, a second call to a first method of a unified application programming interface implemented at the first process control node in response to the first call to a transmission request, wherein the unified application programming interface implemented at the first process control node is communicatively coupled to the upper unified layer implemented at the first process control node;

translating, by a lower unified layer implemented at the first process control node, the first method of the unified application programming interface into a method of a wireless network application programming interface implemented at the first process control node, wherein the lower unified layer implemented at the first process control node is communicatively coupled to the unified application programming interface implemented at the first process control node and to the wireless network application programming interface implemented at the first process control node;

calling, by the lower unified layer implemented at the first process control node, the method of the wireless network application programming interface into the wireless network application programming interface implemented at the first process control node;

issuing, by the requesting process to the serving process, a data access request via a wireless network application programming interface implemented at a second process control node to a lower unified layer implemented at the second process control node in response to implementing the first method, wherein the lower unified layer implemented at the second process control node is communicatively coupled to the wireless network application programming interface implemented at the second process control node;

issuing, by the lower unified layer implemented at the second process control node, a third call to a second method of a unified application programming interface implemented at the second process control node in response to receiving the data access request via the wireless network application programming interface implemented at the second process control node, wherein the unified application programming interface implemented at the second process control node is communicatively coupled to the lower unified layer implemented at the second process control node; and implementing, by an upper layer implemented at the second process control node, the second method of the unified application programming interface implemented at the second process control node in a proprietary application programming interface implemented at the second process control node, wherein the upper unified layer implemented at the second process control node is communicatively coupled to the unified application programming interface implemented at the second process control node and to the proprietary application programming interface implemented at the second process control node.

32. The method of claim 31, wherein issuing, by the upper unified layer implemented at the first process control node, a second call to a first method of a unified application programming interface implemented at the first process control node in response to the first call to a transmission request comprises issuing, by the upper unified layer implemented at the first process control node, a call to a read method of the unified application programming interface implemented at the first process control node in response to the first call to a transmission request.

33. The method of claim 31, wherein issuing, by the upper unified layer implemented at the first process control node, a second call to a first method of a unified application programming interface implemented at the first process control node in response to the first call to a transmission request comprises issuing, by the upper unified layer implemented at the first process control node, a call to a write method of the unified application programming interface implemented at the first process control node in response to the first call to a transmission request.

34. The method of claim 31, wherein issuing, by the lower unified layer implemented at the second process control node, a third call to a second method of a unified application programming interface implemented at the second process control node in response to receiving the data access request via the wireless network application programming interface implemented at the second process control node comprises issuing, by the lower unified layer implemented at the second process control node, a call to a response method of the unified application programming interface implemented at the second process control node in response to receiving the data access request via the wireless network application programming interface implemented at the second process control node.

35. The method of claim 31, wherein implementing, by the upper unified layer implemented at the second process control node, the second method of the unified application programming interface implemented at the second process control node in a proprietary application programming interface implemented at the second process control node comprises:

translating, by the upper unified layer implemented at the second process control node, the second method of the unified application programming interface implemented at the second process control node into a method of the proprietary application programming interface implemented at the second process control node; and calling, by the upper unified layer implemented at the second process control node, the method of the proprietary application programming interface implemented at the second process control node into the proprietary application programming interface implemented at the second process control node.

* * * * *